(12) United States Patent
Yoshikawa

(10) Patent No.: US 9,499,010 B2
(45) Date of Patent: Nov. 22, 2016

(54) PNEUMATIC RADIAL TIRE

(75) Inventor: Yusuke Yoshikawa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 2139 days.

(21) Appl. No.: 12/528,399

(22) PCT Filed: Feb. 12, 2008

(86) PCT No.: PCT/JP2008/052268
§ 371 (c)(1),
(2), (4) Date: Mar. 16, 2010

(87) PCT Pub. No.: WO2008/102667
PCT Pub. Date: Aug. 28, 2008

(65) Prior Publication Data
US 2010/0294410 A1    Nov. 25, 2010

(30) Foreign Application Priority Data
Feb. 23, 2007  (JP) .................................. 2007-044263

(51) Int. Cl.
*B60C 9/18*  (2006.01)
*B60C 9/20*  (2006.01)
(Continued)

(52) U.S. Cl.
CPC .............. *B60C 9/28* (2013.01); *B60C 9/2006* (2013.04); *B60C 11/0083* (2013.04); *B60C 9/2009* (2013.04); *B60C 9/2204* (2013.04); B60C 2009/2012 (2013.04); B60C 2009/283 (2013.04); B60C 2009/286 (2013.04); Y10T 152/10765 (2015.01); Y10T 152/10783 (2015.01); Y10T 152/10792 (2015.01)

(58) Field of Classification Search
CPC ................ B60C 9/2009; B60C 9/2204; B60C 2009/2012; B60C 2009/286; B60C
(Continued)

(56) References Cited

U.S. PATENT DOCUMENTS 4,702,293 A * 10/1987 Iwata et al. .................. 152/531
4,724,878 A    2/1988 Kabe et al.
(Continued)

FOREIGN PATENT DOCUMENTS

EP    0 980 770 A2    2/2000
EP    1 454 766 A1    9/2004
(Continued)

OTHER PUBLICATIONS

Machine Translation: Ito, T; Naruse, K; JP2001-191725A; no date.*
(Continued)

*Primary Examiner* — Michael H Wilson
*Assistant Examiner* — Kendra Ly
(74) *Attorney, Agent, or Firm* — Sughrue Mion, PLLC

(57) ABSTRACT

A pneumatic radial tire including a carcass; two belt reinforcing layers; and a belt formed by two belt layers. A width of a belt cord intersecting region defined by the two belt layers is set in the range of 65 to 90% of the tire width-W, the maximum width of the belt reinforcing layer is set in the range of 60 to 85% of the tire width. Also, a belt radius ratio, which is a ratio of difference between the radius of the belt at the tire equatorial plane and the radius of the belt at a belt side end position thereof measured from the tire axis in a state where the tire is inflated at the standard inner pressure, with respect to a belt half width, is not larger than 0.06.

8 Claims, 4 Drawing Sheets

(51) Int. Cl.
*B60C 9/22* (2006.01)
*B60C 9/28* (2006.01)
*B60C 11/00* (2006.01)

(58) Field of Classification Search
CPC .................. 2009/283;Y10T 152/10765; Y10T 152/10783
USPC ................................ 152/526, 527, 535, 454
IPC ......................................................... B60C 9/18
See application file for complete search history.

(56) References Cited

U.S. PATENT DOCUMENTS

| | | |
|---|---|---|
| 6,386,256 B1 * | 5/2002 | Colom .......................... 152/526 |
| 2005/0000617 A1 * | 1/2005 | Tsuruta .......................... 152/531 |
| 2007/0056672 A1 | 3/2007 | Yamanaka |

FOREIGN PATENT DOCUMENTS

| | | | | |
|---|---|---|---|---|
| JP | 02-208101 A | 8/1990 | | |
| JP | 4-331606 A1 | 11/1992 | | |
| JP | 2001-191727 A | 7/2001 | | |
| JP | 2001191725 A * | 7/2001 | ............... | B60C 9/18 |
| JP | 2003-154808 A | 5/2003 | | |
| JP | 2004-345437 A | 12/2004 | | |
| JP | 2007-001105 A | 1/2007 | | |
| WO | 2006/070533 A1 | 7/2006 | | |

OTHER PUBLICATIONS

Supplementary European Search Report issued in European Application 08720706.4-2425 / 2113398 dated Nov. 5, 2010, 4 pages.
International Search Report, PCT/JP2008/052268, May 13, 2008.

* cited by examiner

PNEUMATIC RADIAL TIRE

CROSS REFERENCE TO RELATED APPLICATIONS

This application is a National Stage of International Application No. PCT/JP2008/052268 filed Feb. 12, 2008, claiming priority based on Japanese Patent Application No. 2007-044263, filed Feb. 23, 2007, the contents of all which are incorporated herein by reference in their entirety.

TECHNICAL FIELD

The present invention relates to a pneumatic radial tire suitable for use as a tire for a heavy load vehicle such as a truck, a bus, etc., a tire for an industrial vehicle, a tire for construction vehicle, and the like, the tire having: a belt reinforcing layer constituted of a reinforcing element including a cord, a filament or the like extending linearly or in a zigzag manner in the tread circumferential direction; and a belt provided on the outer peripheral side of the belt reinforcing layer to overlap the belt reinforcing layer. The present invention proposes, in particular, a technique to effectively prevent separation of a belt, while ensuring good wear resistance at a tread surface.

PRIOR ART

Examples of a pneumatic radial tire provided with a belt reinforcing layer for reinforcing a belt include JP 02-208101.

The tire of JP 02-208101 includes: a carcass of a toroidal shape engagedly held between at least one pair of bead cores; at least two layers of intersecting belt provided around the carcass and constituted of a number of cords or filaments as a reinforcing element intersecting each other at an inclination angle in the range of 10 to 40° with respect to a plane including the center circumference of the carcass, i.e. the equatorial plane, such that the cords or filaments of one belt layer and those of another belt layer are inclined opposite to each other with respect to the equatorial plane and that the carcass is body-reinforced by the intersecting belt; and at least one crown reinforcing layer provided under the intersecting belt and constituted of strips formed by disposing a number of cords or filaments having a wavy or zigzag shape as a reinforcing element so as to be along the equatorial plane as a whole. According to this tire, the strengthened crown portion, which contributes to effective suppression of separation of the intersecting belt, is presumably realized without concern of separation occurring in itself and other troubles in production of a tire.

DISCLOSURE OF THE INVENTION

However, in recent years, as the aspect ratio of a pneumatic tire generally increases due to requests for higher speed and lower chassis of a vehicle, the radial expansion at a tread portion when the tire is inflated at a standard inner pressure is gradually increasing and the aforementioned prior art technique as described above cannot fully address such a large radial expansion of the tire as this. As a result, the problems like early separation of the belt side end portion caused by increase in the magnitude of radial expansion of the tread portion and deterioration of the belt durability resulting therefrom are now being highlighted.

Since a tire having a relatively high aspect ratio exhibits an especially large magnitude of radial expansion in the vicinity of a tread shoulder portion, it has been proposed to dispose a belt reinforcing layer constituted of a reinforcing element extending in the tire circumferential direction, in a widthwise wide range reaching the vicinities of the tread shoulder portion. However, in a case where the width of the belt reinforcing layer is carelessly made large, an extension of the belt in the tire circumferential direction, occurring in an interlayer rubber between the belt reinforcing layer and the belt layer positioned adjacent thereto in the tire radial direction due to the belt being bent toward the inner/outer side in the tire radial direction in a tire side view when the tire is brought into contact with the ground, significantly varies between the belt reinforcing layer and the belt layer. As a result, a relatively large shearing force in the tire circumferential direction is exerted on the belt reinforcing layer and the belt layer, causing a problem that this shearing force facilitates separation between the layers.

Further, such a shearing force in the tire circumferential direction as described above increases, as side ends of the belt layer and the belt reinforcing layer are distanced from the tire equatorial plane, i.e. as the widths of these layers increase. Accordingly, in a tire having a relatively high aspect, generation of separation between these two layers has the more serious impact when the width of the belt reinforcing layer is the more widened for the purpose of suppressing radial expansion of a tread portion thereof.

On the other hand, the belt reinforcing layer constituted of a reinforcing element extending in the tire circumferential direction hardly has rigidity in the in-plane shearing direction, which is rigidity with respect to an in-plane shearing input of each of the tread widthwise direction and the tire circumferential direction, which rigidity has a significant influence on wear at a tread surface. The rigidity in the in-plane shearing direction is thus specified by the inclination angle of belt cords of at least two layers of the belt layer with respect to the tire equatorial plane and the respective widths of cord-intersecting regions in the respective belt cords. Accordingly, the amount of wear at the tread surface is made even in the widthwise direction thereof by enhancing the aforementioned shearing rigidity.

In view of this, it is understood that there exists an antinomy that widening the belt reinforcing layer and the belt layer results in deterioration in belt durability, while widening the intersection belt layer is necessary in terms of improving wear resistance.

In consideration of the facts above, an object of the present invention is to provide a pneumatic radial tire capable of effectively improving belt durability, while ensuring good resistance to wear at a tread surface.

Means for Solving the Problems

A pneumatic radial tire according to the present invention comprises: a carcass of a toroidal shape engagedly held between at least one pair, optionally plural pairs, of bead cores, i.e. a toroidal carcass having a radial structure including at least one carcass ply; at least one layer of belt reinforcing layer constituted of a reinforcing element including cords, filaments or the like extending linearly, in a zigzag manner or the like in the tire circumferential direction and provided on the outer side of a crown region of the toroidal carcass and on the inner side of a tread rubber forming a tread surface; and a belt formed by at least two belt layers and provided on the outer side in the tire radial direction of the belt reinforcing layer, belt cords of one belt layer and those of another belt layer being inclined opposite to each other with respect to the tire equatorial plane, wherein the width of a belt cord intersecting region defined by the at least two belt layers is set in the range of 65 to 90% of the tire width, the maximum width of the belt reinforcing layer is set in the range of 60 to 85% of the tire width, and a belt radius ratio, which is a ratio of difference ($R_0-R_1$) between the radius ($R_0$) of the belt at the tire equatorial plane and the radius ($R_1$) of the belt at a belt side end position thereof measured from the tire axis in a state where the tire is inflated at the standard inner pressure, with respect to a belt half width, is not larger than 0.06.

In the present invention, a "state where the tire is inflated at the standard inner pressure" represents a state where a tire is assembled with an application rim and inflated at a prescribed air pressure, with no load exerted thereon. In the definition above, an "application rim" represents a rim prescribed by the Standards described below in accordance with the size of a tire. A "prescribed air pressure" represents an air pressure prescribed by the Standards below in accordance with the maximum load capacity. "The maximum load capacity" represents the maximum mass which may be exerted on the tire according to the Standards below. In the present invention, "air" may be replaced with an inert gas such as nitrogen gas, or the like.

In the present invention, a "Standard" represents an industrial standard effective in an area where the tire is produced or used. Examples of such a standard as described above include "YEAR BOOK" by THE TIRE AND RIM ASSOCIATION, INC. in the United States, "STANDARDS MANUAL" by The European Tyre and Rim Technical Organisation in Europe and "JATMA YEAR BOOK" by The Japan Automobile Tyre Manufacturers Association, Inc. in Japan.

Further, in the present invention, a "belt radius ($R_0$, $R_1$)" represents, when plural belt layers have the same width, a radius measured at the centerline in thickness direction of the belt and, when plural belt layers have varied widths, a radius measured at the centerline in thickness direction of the belt layer having the largest width. In a normal tire, a radius ($R_0$) is equal to or larger than a radius ($R_1$).

Yet further, a "belt half width" represents a belt width from the equatorial plane to a side end of the belt layer having the largest width. Yet further, a "tire width" represents a sectional width obtained by excluding patterns, letters and the like at sides of the tire, from the overall width of the tire.

In the tire described above, the distance between the centerlines in thickness direction of the belt reinforcing layer and the belt layer adjacent thereto on the outer peripheral side thereof, at a side end position of the belt reinforcing layer, is preferably in the range of 1.8 to 7.0 times as long as the diameter of the reinforcing element of the belt reinforcing layer.

Further, an inclination angle of the belt cords of each belt layer with respect to the tire equatorial plane is preferably in the range of 30° to 70°.

Yet further, in the tire of any aspects described above, the width of the belt cord intersecting region defined by the at least two belt layers is set wider than the maximum width of the belt reinforcing layer.

In the present invention, in a case where belt cords of at least three belt layers intersect each other, a "width of a belt cord intersecting region" represents the maximum intersecting width defined by belt cords of two of the belt layers.

In the tire of the present invention, a tread radius ratio, which is a ratio of difference ($r_0-r_1$) between the radius ($r_0$) of a tread surface at the tire equatorial plane and the radius ($r_1$) of the tread surface at a tread side end position thereof measured from the tire axis in a state where the tire is inflated at the standard inner pressure, with respect to a tread half width, is not larger than 0.07.

In the tire described above, it is preferable to: gradually increase rubber thickness between the belt reinforcing layer and the belt layer adjacent thereto on the outer peripheral side thereof toward the side ends of the adjacent belt layer; set the rubber thickness in the range of 2 to 10 mm at any position thereof in the belt widthwise direction; and setting tensile modulus of rubber between the belt reinforcing layer and the belt adjacent thereto on the outer peripheral side thereof not larger than the tensile modulus of coating rubber of the belt reinforcing layer.

In the present invention, "rubber thickness" does not include the thickness of respective coating rubbers of the belt reinforcing layer and the belt layer.

Effect of the Invention

The inventors of the present invention have made following discoveries, as a result of a keen study to ensure high belt durability, together with good resistance to wear at a tread surface, when the width of a belt reinforcing layer is made as wide as possible.

In a case where the width of a belt reinforcing layer formed of a reinforcing element extending linearly or in a zigzag manner in the tire circumferential direction is increased, the biggest problem is occurrence of separation between the belt reinforcing layer and the belt layer adjacent thereto on the outer peripheral side thereof, which separation causes belt durability to deteriorate. Specifically, such separation is caused because: extension of the belt in the tire circumferential direction occurs between the belt reinforcing layer and the belt layer, between the side end portions thereof, in particular, due to bending deformation in the circumferential direction; since there exists difference in magnitude of deformation in the tire circumferential direction due to the difference in extension of the belt in the circumferential direction, shear strain in the tire circumferential direction is generated in rubber between the belt reinforcing layer and the belt layer, which shear strain causes cracks in the vicinity of the side end of the belt reinforcing layer; and these cracks develop between the belt reinforcing layer and the belt layer, causing separation of the layers. When such separation as described above has occurred, the tire can no longer be rotated for running.

Regarding the problem above, the inventors of the present invention have discovered that it is effective to suppress deformation in the tire circumferential direction of the belt layer, which may make significant extensional deformation in the circumferential direction due to bending deformation in the tire circumferential direction, and thus reduce the difference in magnitude of deformation between the belt reinforcing layer and the belt layer in the tread circumferential direction.

Further, regarding deformation of the belt layer in the tire circumferential direction, the inventors of the present invention have discovered that: in a case where the difference ($R_0-R_1$) between the radius ($R_0$) of the belt at the tire equatorial plane and the radius ($R_1$) of the belt at a belt side end position thereof measured from the tire axis is relatively large, the smaller $R_1$ with respect to $R_0$ results in the side end position of the belt layer being located on the further outer side of the neutral axis of the bending in the circumferential direction and thus larger tensile force exerted thereon with respect to the deformation in the tire circumferential direction, whereby the belt exhibits relatively large extension in the circumferential direction at the belt side end position; and that in a case where the difference in radius ($R_0-R_1$) is sufficiently small, in particular, a case where a belt radius ratio (difference/belt width) of the difference ($R_0-R_1$) with respect to the belt half width is not larger than 0.06, in-plane shear strain and thus deformation in the tire circumferential direction can be effective suppressed.

The belt radius ratio is preferably equal to or larger than 0.02. In a case where the radius ratio is smaller than 0.02, it is difficult to sufficiently ensure the tread rubber gauge in the vicinity of the tread shoulder portion.

Even in a case where the radius difference ($R_0-R_1$) is selectively set at such a small value as described above, if the maximum width of the belt reinforcing layer is smaller than 60% of the tire width, change in shape due to deformation by radial expansion caused by tire rotation increases, whereby it is difficult to ensure good resistance to wear in long-term use of a tire. Therefore, in the present invention, realization of superior belt durability is ensured by setting the maximum width of the belt reinforcing layer equal to or larger than 60% of the tire width. In a case where the maximum width of the belt reinforcing layer exceeds 85% of the tire width, the side end portions of the respective layers are likely to be aligned, whereby stepwise difference in rigidity in the tire widthwise direction is increased and troubles are more likely to occur at the belt side end. Therefore, in the present invention, the upper limit of the maximum width of the belt reinforcing layer is set at 85% of the tire width.

In the present invention, in a case where the width of the belt cord intersecting region in the at least two belt layers is smaller than 65% of the tire width, the in-plane shear rigidity of a side region of the tread portion is insufficient, whereby local wear occurs at a tread surface at a relatively early stage. Therefore, in the tire of the present invention, the width of the belt cord intersecting region is set equal to or larger than 65% of the tire width, so that generation of local wear is suppressed. However, in a case where the width of the belt cord intersecting region exceeds 90% of the tire width, the maximum width of the belt layer exceeds the tread width and there arises a problem that production of such a tire is difficult. Therefore, in the present invention, the upper limit of the width of the belt cord intersecting region is set at 90% so that such a problem as described above is prevented from occurring.

In the tire as described above, in a case where the distance between the centerlines in thickness direction of the belt reinforcing layer and the belt layer adjacent thereto on the outer peripheral side thereof, at a side end position of the belt reinforcing layer, is equal to or larger than 1.8 times as long as the diameter of the reinforcing element, e.g. a cord, of the belt reinforcing layer, sufficient rubber thickness is ensured between the belt reinforcing layer and the belt layer and the shear strain in the circumferential direction generated due to difference in circumferential extension between the belt layer and the belt reinforcing layer can be effectively reduced, whereby separation between these two layers can be further effectively suppressed.

In the present invention, the upper limit of the distance between the centerlines in thickness direction of the belt reinforcing layer and the belt layer is preferably 7.0 times as large as the cord diameter. Specifically, in a case where the distance exceeds 7.0 times as large as the cord diameter, the total thickness of the tread shoulder portion is so thick that the amount of heat generation during tire rotation increases, making improvement of durability difficult.

Further, in a case where the inclination angle of belt cords of each belt layer with respect to the tire equatorial plane is in the range of 30° to 70°, there can be achieved a high degree of compatibility between belt durability and good resistance to wear at a tread surface.

Specifically, in a case where the aforementioned inclination angle is smaller than 30°, shear strain in the tire circumferential direction between the intersecting layers, which may cause a trouble, increases, whereby belt durability is likely to deteriorate. In a case where the aforementioned inclination angle exceeds 70°, in-plane shear rigidity of the intersecting layers is decreased, whereby wear resistance property is deteriorated.

Yet further, in a case where the width of the belt cord intersecting region of the at least two belt layers is wider than the maximum width of the belt reinforcing layer, steep change in rigidity at an end portion of the belt reinforcing layer can be alleviated by the cord intersecting layers.

In the tire of any aspects described above, in a case where a tread radius ratio, which is a ratio of difference ($r_0-r_1$) between the radius ($r_0$) of a tread surface at the tire equatorial plane and the radius ($r_1$) of the tread surface at a tread side end position thereof measured from the tire axis in a state where the tire is inflated at the standard inner pressure, with respect to the tread half width, is not larger than 0.07, the rubber gauge of the tread shoulder portion can be ensured to substantially the same degree as that of the tread center region.

In the present invention, in a case where the rubber thickness between the belt reinforcing layer and the belt layer adjacent thereto on the outer peripheral side thereof is gradually increased toward the respective side ends of the belt layer, the required interlayer distance is ensured without a problem, whereby shear strain in the circumferential direction between the belt reinforcing layer and the adjacent belt layer can be advantageously decreased.

Further, in a case where the rubber thickness between the belt reinforcing layer and the belt layer adjacent thereto on the outer peripheral side thereof is in the range of 2 to 10 mm, the aforementioned shear strain in the tire circumferential direction can be more effectively decreased.

Specifically, in a case where the aforementioned interlayer rubber thickness is less than 2 mm, it is difficult to make the interlayer rubber sufficiently demonstrate the strain-suppressing function. In a case where the aforementioned interlayer rubber thickness exceeds 10 mm, the amount of heat generation by the interlayer rubber increases too much, whereby durability to heat generation may deteriorate.

Yet further, in a case where tensile modulus of rubber between the belt reinforcing layer and the belt layer adjacent thereto on the outer peripheral side thereof is not larger than the tensile modulus of coating rubber of the belt reinforcing layer, it is possible to make the soft interlayer rubber absorb shear strain in the tire circumferential direction further more effectively.

In the present invention, "tensile modulus" of rubber represents tensile modulus when the rubber is 50% extended (M50).

EXPLANATION OF REFERENCE NUMERALS

Figure 1:
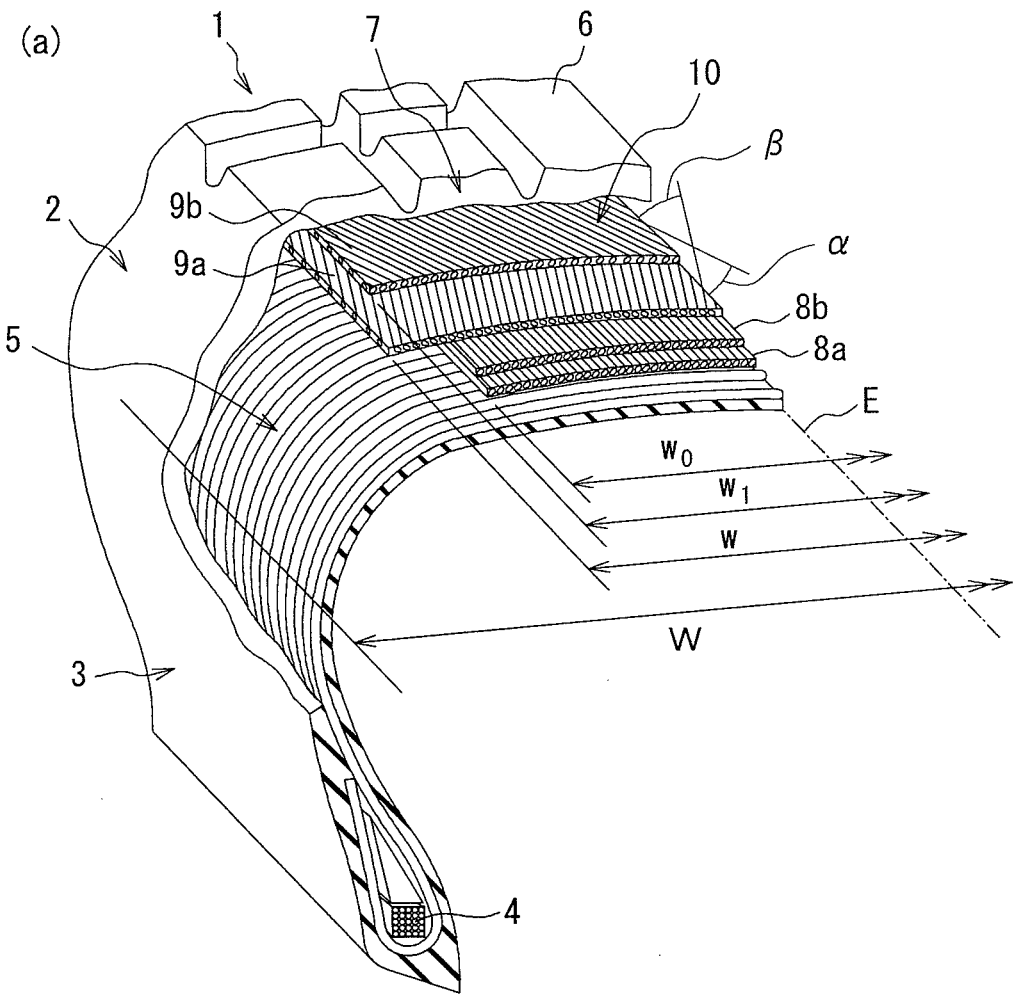
FIG. 1(*a*) is a partial, sectional perspective view and FIG. 1(*b*) is a tire widthwise sectional view of a tread half portion, of an embodiment of the present invention.
Figure 1:
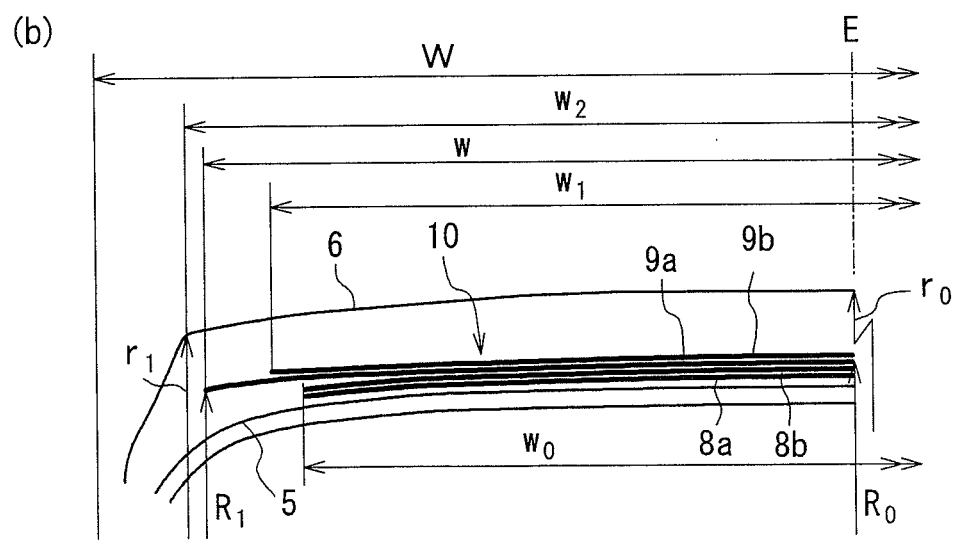

1 Tread portion
2 Sidewall portion
3 Bead portion
4 Bead core
5 Carcass
6 Tread surface
7 Tread rubber
8a, 8b Belt reinforcing layer having the largest width
9a, 9b Belt layer
10 Belt
E Tire equatorial plane
W Tire width
$W_0$ Width of belt reinforcing layer having the largest width
w Width of belt layer having the largest width
$R_0$, $R_1$ Belt radius
$r_0$, $r_1$ Tread surface radius
$w_1$ Width of belt intersecting region
$w_2$ Tread width
α, β Inclination angle of belt cord
t Distance between centerlines in thickness direction of layers

BEST MODE FOR CARRYING OUT THE INVENTION

FIGS. 1(a) and 1(b) are views each showing a pneumatic radial tire of an embodiment of the present invention. FIG. 1(a) is a partial, sectional perspective view showing a half part of a tire in a manner that a portion of the half part of the tire has been exploded. FIG. 1(b) is a tire widthwise sectional view showing the half part of a tread portion in a state where the tire is inflated at an inner pressure.

In FIG. 1, the reference number 1 represents a tread portion, 2 represents a pair of sidewall portions continuous with respective side portions of the tread portion 1 and extending toward inner side in the tire radial direction, and 3 represents a bead portion continuous with the inner peripheral side of each sidewall portion 2.

In the present invention shown in FIG. 1, a pair of bead cores 4 is provided in the bead portion 3, although plural pairs of bead cores may be optionally provided. The tire of the present embodiment comprises: a carcass 5 of a toroidal shape constituted of, e.g. one carcass ply, and engagedly held around the respective bead cores 4 such that respective side portions of the carcass are wound around the bead cores; dual-layered belt reinforcing layers 8a, 8b having widths equal to each other, constituted of a reinforcing element including cords, filaments or the like (e.g. cords) extending linearly or in a zigzag manner (linearly in the drawing) in the circumferential direction of the tread portion 1 and provided on the outer side of a crown region of the toroidal carcass 5 and on the inner side of a tread rubber 7 forming a tread surface 6, which tread surface is provided in the tread portion 1; and a belt 10 formed by at least two belt layers (two belt layers 9a, 9b in the example shown in the drawings) and provided on the outer side in the tire radial direction of the belt reinforcing layer, belt cords of one belt layer and those of another belt layer being inclined opposite to each other with respect to the tire equatorial plane E, wherein the widths of the two belt layers 9a, 9b of the belt 10 are respectively set larger than the width $w_0$ of the belt reinforcing layer 8a, 8b having the largest width, the width of the outer belt layer 9b is set narrower than the width w of the inner belt layer 9a having the largest width, the width $w_1$ of a belt cord intersecting region defined by the two belt layers 9a, 9b is set in the range of 65 to 90% of the tire width W, and the width $w_0$ of the belt reinforcing layer having the largest width is set in the range of 60 to 85% of the tire width W.

In the present embodiment, a belt radius ratio $(R_0-R_1)/(w/2)$, which is a ratio of difference $(R_0-R_1)$ between the radius $R_0$ of the belt 10 (the belt layer 9a having the largest width in the present embodiment) at the tire equatorial plane E and the radius $R_1$ of the belt 10 (the belt layer 9a) at a belt side end position thereof ($R_1$ is generally smaller than $R_0$) measured from the tire axis in such a state where the tire is inflated at the standard inner pressure as shown in the drawing, with respect to the belt half width or the half width w/2 of the belt layer having the largest width, is in the range of 0.06 to 0.02.

In the aforementioned pneumatic radial tire structure, belt durability can be effectively enhanced, while good resistance to wear at a tread surface is ensured, as described above.

Figure 2:
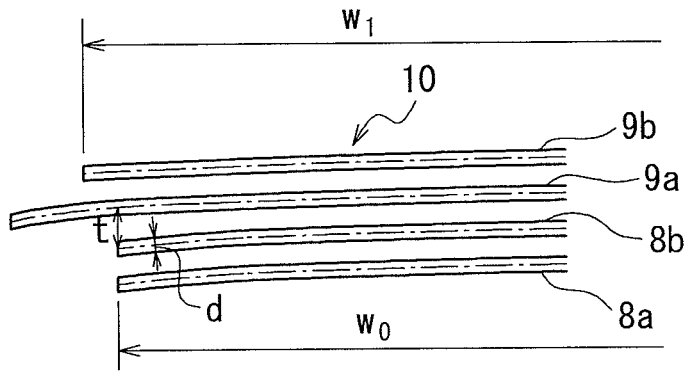
FIG. 2 is an enlarged view showing a distance between centerlines in thickness direction of the outer layer of the belt reinforcing layers and the inner layer of the belt layers at an outer end position of the belt reinforcing layer.

In the tire described above, it is more preferable that the distance between centerlines in thickness direction of the belt reinforcing layer 8b and the belt layer 9a adjacent thereto on the outer peripheral side thereof, at a side end position of the belt reinforcing layer, i.e. in FIG. 2 showing the main part in an enlarged manner, the distance t between cord centerlines of a cord forming the belt reinforcing layer 8b and a belt cord forming the belt layer 9a along a line in the tire radial direction passing through a side end position of the belt reinforcing layer 8b, is in the range of 1.8 to 7.0 times as large as the diameter d of the belt reinforcing layer 8b.

In the case described above, it is preferable that an interlayer rubber (not shown) is provided between the belt reinforcing layer 8b and the belt layer 9a adjacent thereto on the outer peripheral side thereof such that the thickness of the inter layer gradually increases toward respective side ends of the belt layer 9a, to allow the desired distance t between cord centerlines to be ensured with sufficient accuracy without causing a problem.

Regarding provision of such an interlayer rubber as described above, it is preferable that thickness of the interlayer rubber is set in the range of 2 to 10 mm in terms of making the interlayer rubber well demonstrate a strain-suppressing function and decreasing an amount of heat generation by the interlayer itself.

By setting tensile modulus of the interlayer rubber not larger than the tensile modulus of coating rubber of the belt reinforcing layer, it is possible to make the interlayer rubber absorb strain more effectively due to high softness thereof.

Further, it is preferable that the inclination angles α, β of belt cords of the belt layers 9a, 9b with respect to the tire equatorial plane E, as shown in FIG. 1(a), are in the range of 30° to 70°, respectively.

Yet further, the width $w_1$ of a belt cord intersecting region defined by at least two belt layers (the two belt layers 9a, 9b in the example shown in the drawings) is preferably set larger than the width $w_0$ of the belt reinforcing layer 8a, 8b having the largest width.

In the tire of any aspects described above, it is more preferable that a tread radius ratio $(r_0-r_1)/(w/2)$, which is a ratio of difference $(r_0-r_1)$ between the radius $r_0$ of the tread surface 6 at the tire equatorial plane E and the radius $r_1$ of the tread surface 6 at a tread side end position thereof measured from the tire axis in such a state where the tire is inflated at the standard inner pressure, with respect to the tread half width $w_2/2$, is set nor larger than 0.07.

Figure 3:
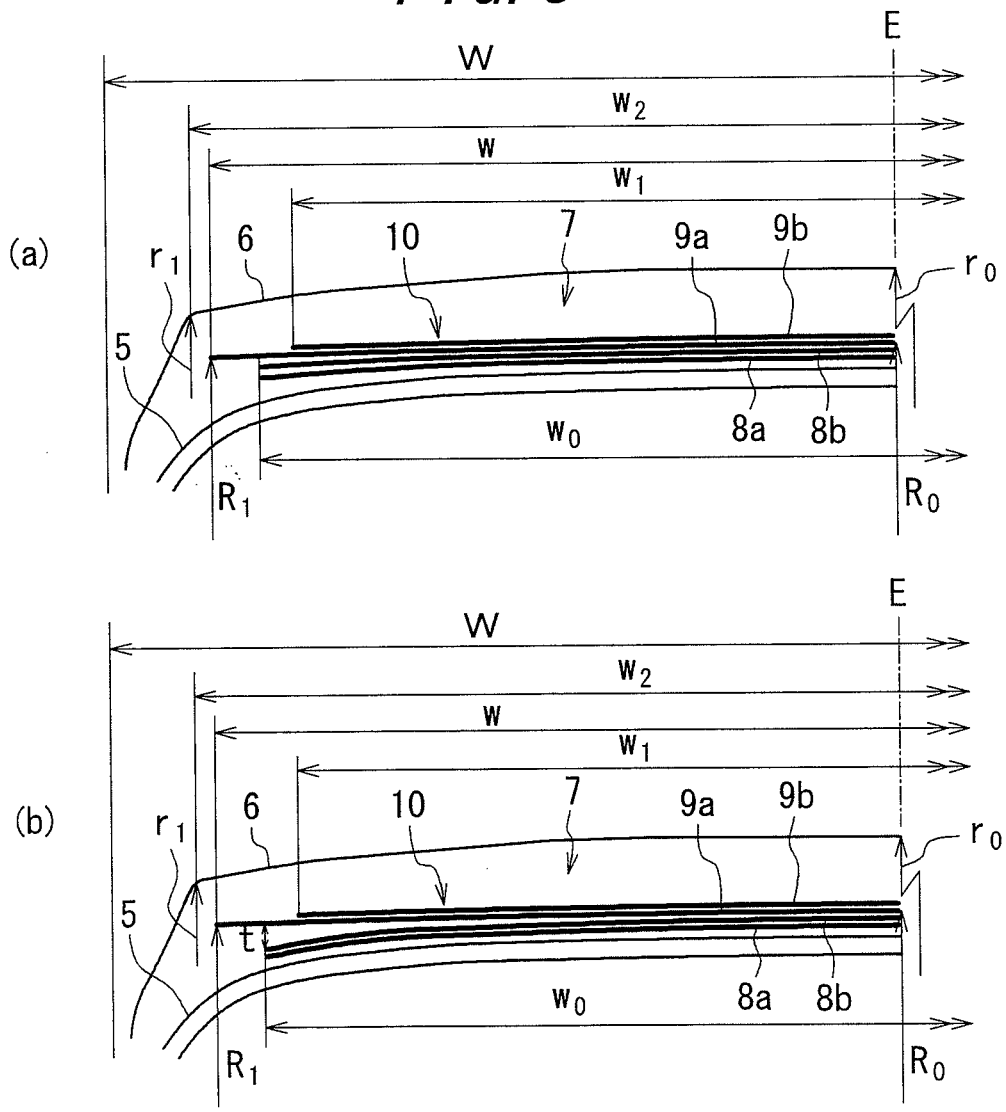
FIG. 3(a) and FIG. 3(b) are tire widthwise sectional views of a tread half portion of another embodiment of the present invention, respectively.

FIGS. 3(a) and 3(b) are views showing another embodiment. FIG. 3(b) is a tire widthwise sectional view similar to FIG. 1(b). In the structure shown in FIG. 3(a), the width $w_0$ of the belt reinforcing layer 8a, 8b having the largest width is larger than that shown in FIG. 1(b), so that the side portions of the belt reinforcing layers 8a, 8b both protrude on the outer side in the widthwise direction than the outer belt layer 9b; and the extending forms of the belt reinforcing layers 8a, 8b and the belt layers 9a, 9b, in particular, the side portions thereof, in a section shown in the drawings are slightly changed from those shown in FIG. 1(b), so that the belt radius difference $(R_0-R_1)$ thereof is made smaller than that of the structure shown in FIG. 1(b).

Further, in the structure shown in FIG. 3(b), the width $w_0$ of the belt reinforcing layer 8a, 8b having the largest width is the same as that shown in FIG. 3(a) and the extending forms and widths of the belt layers 9a, 9b are the same as those shown in FIG. 3(a), while the extending forms of the belt reinforcing layers 8a, 8b in respective side portions thereof are changed, so that the distance t between cord centerlines of a cord forming the belt reinforcing layer 8b and a belt cord forming the belt layer 9a along a line in the tire radial direction passing through a side end position of the belt reinforcing layer 8b is made larger than that in any of the structural examples described above.

Figure 4:
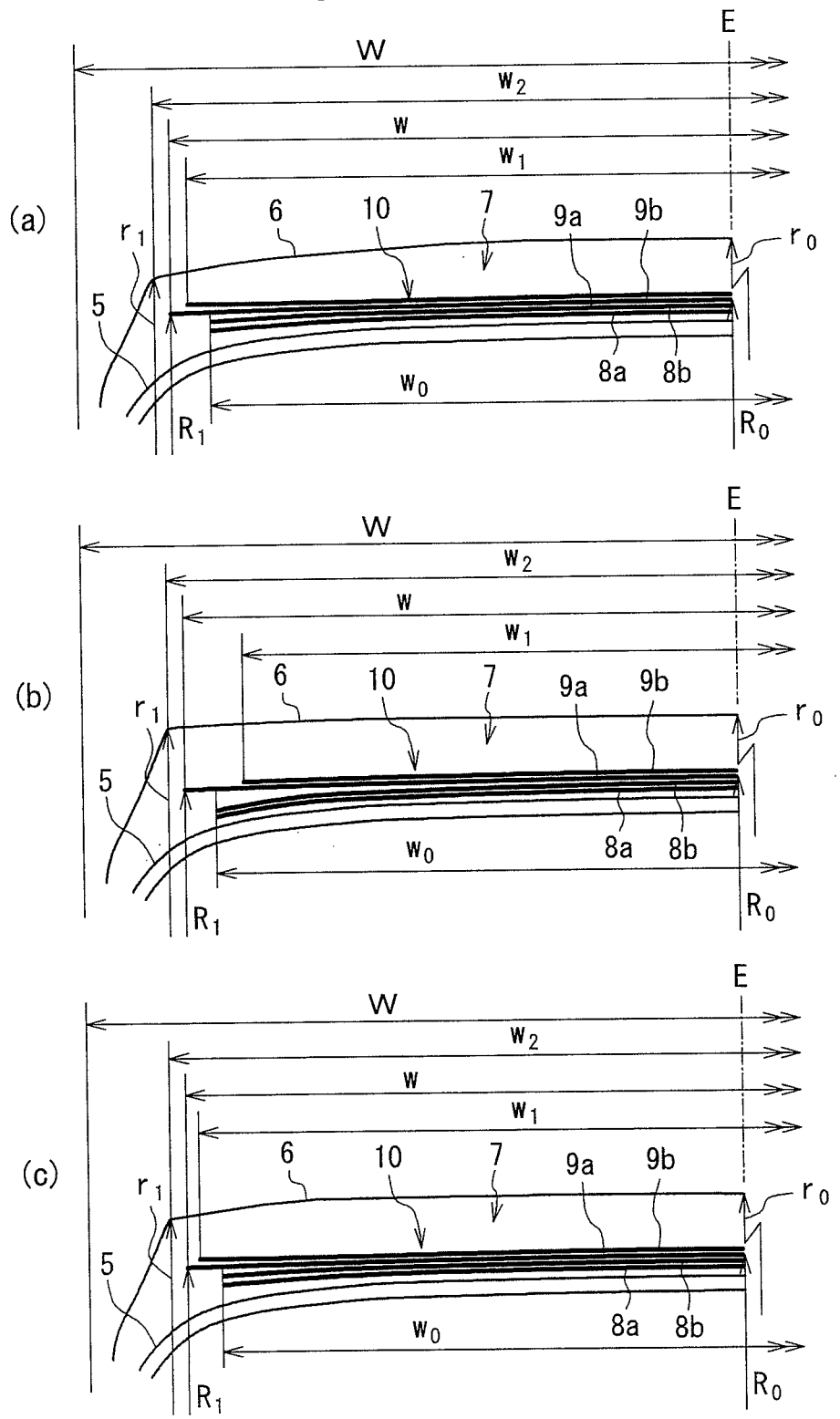
FIG. 4(a), FIG. 4(b) and FIG. 4(c) are tire widthwise sectional views showing yet another embodiment of the present invention, respectively.

Yet further, FIGS. 4(a) to 4(c) show yet another embodiment. In the structure shown in FIG. 4(a), as compared with the structure shown in FIG. 3(a), the width of the outer belt layer 9b is smaller than that of the inner belt layer 9a and larger than that of the belt reinforcing layer 8a, 8b having the largest width. In the structure shown in FIG. 4(b), the distance t between cord centerlines of a cord forming the belt reinforcing layer 8b and a belt cord forming the belt layer 9a at a side end position of the belt reinforcing layer 8b is further increased, as compared with that shown in FIG. 3(b), and a tread radius difference $(r_0-r_1)$ of the tread surface 6 is made smaller than that in any of the structural examples described above.

Yet further, in the structure shown in FIG. 4(c), a tread radius difference $(r_0-r_1)$ of the tread surface 6 is slightly larger than that shown in FIG. 4(b).

EXAMPLES

Each of an Example tire, a Conventional Example tire and a Comparative Example tire having the size of 435/45 R22.5 was assembled with a rim of 14.00×22.5. Belt durability and wear resistance at a tread surface of each of these tires were evaluated in a state where the tire was inflated at an air pressure of 900 kPa.

Example 1 tire had a structure of a tread portion as shown in FIGS. 1(a), 1(b) and 2, the tires of Examples 2 and 3 had structures as shown in FIGS. 3(a) and 3(b), respectively, and the tires of Examples 4 to 6 had structures as shown in FIGS. 4(a), 4(b) and 4(c), respectively.

Figure 5:
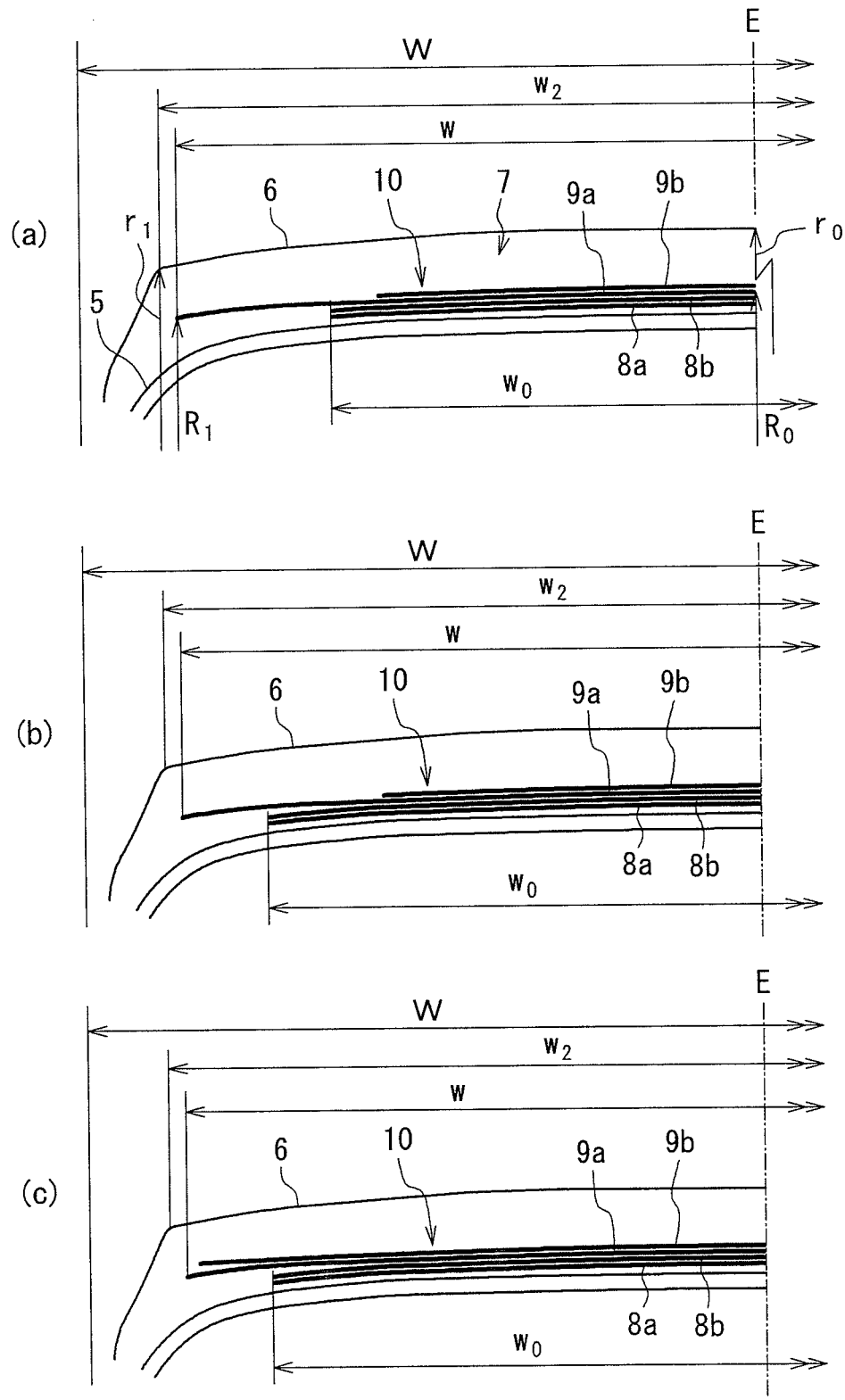
FIG. 5(a) is a sectional view showing a tire of Conventional Example and FIG. 5(b) and FIG. 5(c) are sectional views showing tires of Comparative Examples, respectively.

Further, Conventional Example tire had a structure as shown in FIG. 5(a) and the tires of Comparative Examples 1 and 2 had structures as shown in FIGS. 5(b) and 5(c), respectively.

The dimensional characteristics of these tires, together with the evaluation results thereof, are shown in Table 1.

Belt durability was evaluated by: carrying out a test by an in-door tire tester under the conditions that drum load: 59.0 kN and drum speed: 60.0 km/h; counting time required for separation to occur between the belt reinforcing layer and the belt layer; and expressing the result by an index number. The larger index number represents the better result.

Wear resistance at a tread surface was evaluated by: mounting each test tire on a driving wheel of a tractor and linking the tractor to a trailer vehicle carrying the maximum load; running the vehicle 50,000 km on a super highway; and obtaining a ratio of the wear amount at a portion where the tread rubber had been worn least with respect to the wear amount at a portion where the tread rubber had been worn most. The larger index number represents the better result.

TABLE 1

|  | Conventional Example tire | Comparative Example 1 tire | Comparative Example 2 tire | Example 1 Tire | Example 2 tire | Example 3 tire | Example 4 Tire | Example 5 tire | Example 6 tire |
|---|---|---|---|---|---|---|---|---|---|
| Corresponding drawing | FIG. 5(a) | FIG. 5(b) | FIG. 5(c) | FIG. 1, FIG. 2 | FIG. 3(a) | FIG. 3(b) | FIG. 4(a) | FIG. 4(b) | FIG. 4(c) |
| Tire width [mm] | 435 | 435 | 435 | 435 | 435 | 435 | 435 | 435 | 435 |
| Tread width (W) [mm] | 390 | 390 | 390 | 390 | 390 | 390 | 390 | 390 | 390 |
| Width ($w_0$) of belt reinforcing layer [mm] | 250 | 300 | 300 | 300 | 340 | 340 | 340 | 340 | 340 |
| Width of belt layer 9a [mm] | 360 | 360 | 360 | 360 | 360 | 360 | 360 | 360 | 360 |
| Cord angle of belt layer 9a [deg] | 22 | 22 | 50 | 50 | 50 | 50 | 50 | 50 | 50 |
| Width of belt layer 9b [mm] | 210 | 330 | 330 | 330 | 330 | 330 | 350 | 350 | 350 |
| Cord angle of belt layer 9b [deg] | 22 | 22 | 22 | 50 | 50 | 50 | 50 | 50 | 50 |
| Belt radius ratio $(R_0 - R_1)/(w/2)$ | 0.07 | 0.07 | 0.07 | 0.05 | 0.04 | 0.04 | 0.04 | 0.04 | 0.04 |
| Tread radius ratio $(r_0 - r_1)/(w/2)$ | 0.085 | 0.085 | 0.085 | 0.065 | 0.065 | 0.065 | 0.065 | 0.04 | 0.04 |

TABLE 1-continued

|  | Conventional Example tire | Comparative Example 1 tire | Comparative Example 2 tire | Example 1 Tire | Example 2 tire | Example 3 tire | Example 4 Tire | Example 5 tire | Example 6 tire |
|---|---|---|---|---|---|---|---|---|---|
| Cord diameter of belt reinforcing layer [mm] | 1.4 | 1.4 | 1.4 | 1.4 | 1.4 | 1.4 | 1.4 | 1.4 | 1.4 |
| Distance between cord centerlines/cord diameter [mm] | 1.5 | 1.5 | 1.5 | 2.5 | 5.0 | 5.0 | 5.0 | 5.0 | 8.0 |
| Durability (index value) | 80 | 90 | 100 | 120 | 117 | 125 | 118 | 140 | 110 |
| Wear resistance (Index value) | 90 | 100 | 100 | 120 | 125 | 125 | 135 | 135 | 135 |

From the results shown in Table 1, it is understood that the Example tires each including a belt reinforcing layer having a relatively large width are capable of demonstrating superior belt durability, while ensuring good resistance to wear. In contrast, in Conventional Example tire and the tires of Comparative Examples 1 and 2, in each of which the inclination angle of belt cords of each belt layer is 22° and the belt radius ratio is 0.085, deterioration of belt durability is obvious.

The invention claimed is:

1. A pneumatic radial tire, comprising:
    a carcass of a toroidal shape engagedly held between at least one pair of bead cores;
    at least one layer of belt reinforcing layer constituted of a reinforcing element extending in the tire circumferential direction, and provided on the outer side of a crown region of the carcass and on the inner side of a tread rubber; and
    a belt formed by at least two belt layers and provided on the outer side in the tire radial direction of the belt reinforcing layer, belt cords of one belt layer and those of another belt layer being inclined opposite to each other with respect to the tire equatorial plane,
    wherein the width of a belt cord intersecting region defined by the at least two belt layers is set in the range of greater than 80% and less than or equal to 90% of a tire width, the width of the belt reinforcing layer is set in the range of 60 to 85% of the tire width, and a belt radius ratio, which is a ratio of difference ($R_0-R_1$) between the radius ($R_0$) of the belt at the tire equatorial plane and the radius ($R_1$) of the belt at a belt side end position thereof measured from the tire axis in a state where the tire is inflated at the standard inner pressure, with respect to a belt half width, is not larger than 0.06, and
    wherein an outermost end, in the tire width direction, of a radially outermost belt layer is provided at a radial position that is not above a radial position of the radially outermost belt layer at the tire equatorial plane.

2. The pneumatic radial tire of claim 1, wherein a distance between centerlines in thickness direction of the belt reinforcing layer and the belt layer adjacent thereto on the outer peripheral side thereof, at a side end position of the belt reinforcing layer, is in the range of 1.8 to 7.0 times as long as the diameter of the reinforcing element of the belt reinforcing layer.

3. The pneumatic radial tire of claim 1, wherein an inclination angle of the belt cords of each belt layer with respect to the tire equatorial plane is in the range of 30° to 70°.

4. The pneumatic radial tire of claim 1, wherein the width of the belt cord intersecting region defined by the at least two belt layers is set wider than the width of the belt reinforcing layer.

5. The pneumatic radial tire of claim 1, wherein a tread radius ratio, which is a ratio of difference ($r_0-r_1$) between the radius ($r_0$) of a tread surface at the tire equatorial plane and the radius ($r_1$) of the tread surface at a tread side end position thereof measured from the tire axis in a state where the tire is inflated at the standard inner pressure, with respect to a tread half width, is not larger than 0.07.

6. The pneumatic radial tire of claim 1, wherein rubber thickness between the belt reinforcing layer and the belt layer adjacent thereto on the outer peripheral side thereof gradually increases toward side ends of the adjacent belt layer.

7. The pneumatic radial tire of claim 1, wherein rubber thickness between the belt reinforcing layer and the belt layer adjacent thereto on the outer peripheral side thereof is set in the range of 2 to 10 mm.

8. The pneumatic radial tire of claim 1, wherein tensile modulus of rubber between the belt reinforcing layer and the belt layer adjacent thereto on the outer peripheral side thereof is set not larger than the tensile modulus of coating rubber of the belt reinforcing layer.

* * * * *